(12) United States Patent
Inoue et al.

(10) Patent No.: US 8,934,001 B2
(45) Date of Patent: Jan. 13, 2015

(54) EYEGLASS DEVICE AND VIDEO SYSTEM

(75) Inventors: Shuji Inoue, Osaka (JP); Hiroshi Mitani, Osaka (JP); Kazuhiro Mihara, Osaka (JP); Masanobu Inoe, Osaka (JP); Katsuo Saigo, Hyogo (JP); Seiji Nakazawa, Osaka (JP)

(73) Assignee: Panasonic Corporation, Osaka (JP)

( * ) Notice: Subject to any disclaimer, the term of this patent is extended or adjusted under 35 U.S.C. 154(b) by 672 days.

(21) Appl. No.: 13/242,553

(22) Filed: Sep. 23, 2011

(65) Prior Publication Data

US 2012/0007966 A1 Jan. 12, 2012

Related U.S. Application Data

(63) Continuation of application No. PCT/JP2011/000180, filed on Jan. 14, 2011.

(30) Foreign Application Priority Data

Jan. 15, 2010 (JP) .................................. 2010-007107

(51) Int. Cl.
*H04N 13/04* (2006.01)

(52) U.S. Cl.
CPC ....... *H04N 13/0454* (2013.01); *H04N 13/0438* (2013.01); *H04N 2213/008* (2013.01)
USPC .................. 348/54; 345/32; 345/419; 348/43; 348/53; 348/56; 348/59; 359/464; 359/465

(58) Field of Classification Search
CPC .................. H04N 2213/008; H04N 2213/002
USPC ............................................ 348/54; 359/464
See application file for complete search history.

(56) References Cited

U.S. PATENT DOCUMENTS

| 5,293,227 A | 3/1994 | Prince |
| 2010/0149320 A1 | 6/2010 | MacNaughton et al. |
| 2010/0149636 A1 | 6/2010 | MacNaughton et al. |

(Continued)

FOREIGN PATENT DOCUMENTS

| JP | 6-46460 | 2/1994 |
| JP | 7-336729 | 12/1995 |

(Continued)

OTHER PUBLICATIONS

International Search Report issued Apr. 19, 2011 in International (PCT) Application No. PCT/JP2011/000180.

*Primary Examiner* — Jay Patel
*Assistant Examiner* — Neil Mikeska
(74) *Attorney, Agent, or Firm* — Wenderoth, Lind & Ponack, L.L.P.

(57) ABSTRACT

An eyeglass device for assisting in viewing a video to be stereoscopically perceived includes an optical filter portion with left and right filters for adjusting light amount to be transmitted to left and right eyes, respectively and a controller for controlling adjustment operation of the light amount by the optical filter portion, wherein the controller switches a control mode of the optical filter portion between a first control mode of controlling the optical filter portion so that the adjustment operation becomes synchronized with display of a frame image of the video and a second control mode of controlling the optical filter so that that the adjustment operation becomes slower than a frame rate of the video to make a viewer perceive the adjustment operation which is asynchronous with the display of the frame image.

13 Claims, 11 Drawing Sheets

(56) References Cited

U.S. PATENT DOCUMENTS

| | | |
|---|---|---|
| 2010/0157027 A1 | 6/2010 | MacNaughton et al. |
| 2010/0157028 A1 | 6/2010 | MacNaughton et al. |
| 2010/0157029 A1 | 6/2010 | MacNaughton et al. |
| 2010/0157031 A1 | 6/2010 | MacNaughton et al. |
| 2010/0157178 A1 | 6/2010 | MacNaughton et al. |
| 2010/0165085 A1 | 7/2010 | MacNaughton et al. |
| 2010/0177254 A1 | 7/2010 | MacNaughton et al. |
| 2010/0245693 A1 | 9/2010 | MacNaughton et al. |
| 2011/0001808 A1* | 1/2011 | Mentz et al. .................... 348/59 |
| 2011/0025821 A1* | 2/2011 | Curtis et al. .................... 348/43 |
| 2011/0149028 A1* | 6/2011 | Klebanov et al. ............... 348/43 |
| 2011/0199464 A1 | 8/2011 | MacNaughton et al. |
| 2011/0310348 A1* | 12/2011 | MacNaughton et al. ......... 353/8 |

FOREIGN PATENT DOCUMENTS

| | | |
|---|---|---|
| JP | 8-322065 | 12/1996 |
| JP | 8-331603 | 12/1996 |
| JP | 9-90292 | 4/1997 |
| JP | 11-98540 | 4/1999 |
| JP | 2010-124466 | 6/2010 |

\* cited by examiner

US 8,934,001 B2

EYEGLASS DEVICE AND VIDEO SYSTEM

This application is a Rule 1.53(b) Continuation of International Application No. PCT/JP2011/000180 with the International Filing Date of Jan. 14, 2011.

TECHNICAL FIELD

The present invention is related to an eyeglass device and a video system for providing a viewer with a stereoscopic video.

BACKGROUND ART

Recent progresses of video technologies include development of video systems for providing a video (stereoscopic video), which is stereoscopically perceived by a viewer. Such a video system typically comprises a display device configured to display a video including a left frame image to be viewed by the left eye and a right frame image to be viewed by the right eye, and an eyeglass device configured to assist in viewing the video, which is displayed by the display device (for example, refer to Patent Document 1). The display device sends a synchronization signal, which synchronizes with the display of the frame images of the video while the eyeglass device executes the stereoscopic visual assistance for assisting in viewing the video in response to the synchronization signal. As a result of the eyeglass device executing the stereoscopic visual assistance which synchronizes with the display of frame images of the video, the viewer may stereoscopically perceive the video displayed by the display device.

The eyeglass device worn by a viewer typically looks like eyeglasses for correcting vision. It is suitable for such usage of the eyeglass device in general to utilize a compact and portable battery as a power source of the eyeglass device. It becomes less likely that the stereoscopic visual assistance keeps up with the display of the frame images of the stereoscopic video which the viewer views if the stereoscopic visual assistance of the eyeglass device decreases the battery power too much. It is less likely that the viewer wearing the eyeglass device identifies a failure in the stereoscopic visual assistance of the eyeglass device, which is caused by shortage of the remaining battery power. Consequently, the viewer may not comfortably enjoy the stereoscopic video.

As another failure of the eyeglass device, there is a communication failure of the synchronization signal between the display device and the eyeglass device. If the communication fails, the eyeglass device of Patent Document 1 allows light to be transmitted to the left and right eyes. Consequently, the viewer may continue to view the video even during the communication failure.

The control for allowing the light to be transmitted to the left and right eyes during the communication failure, like the eyeglass device disclosed in Patent Document 1, enables the viewer to view the video, but the viewer may no longer stereoscopically view the video. Since the viewer can still view the video, it becomes less likely that the viewer becomes aware of the occurrence of the failure in the eyeglass device. Accordingly, the viewer may not comfortably enjoy the video.

Used hours of the eyeglass device may be also exemplified as information to be communicated to the viewer, in addition to the aforementioned information about failures, which occurs in the eyeglass device. Prolonged use of the eyeglass device may make the viewer's eyes excessively tired.

Patent Document 1: Japanese Patent Application Laid-open No. H6-46460

SUMMARY OF THE INVENTION

An object of the present invention is to provide an eyeglass device and a video system which notifies information from the eyeglass device to a viewer wearing the eyeglass device configured to assist in viewing a video to be stereoscopically perceived.

An eyeglass device for assisting in viewing a video to be stereoscopically perceived according to one aspect of the present invention includes an optical filter portion including a left filter configured to adjust a light amount which is transmitted to a left eye and a right filter configured to adjust a light amount which is transmitted to a right eye; and a controller configured to control adjustment operation of the light amount by the optical filter portion, wherein the controller switches a control mode of the optical filter portion between a first control mode of controlling the optical filter portion so that the adjustment operation becomes synchronized with display of a frame image of the video and a second control mode of controlling the optical filter portion so that the adjustment operation becomes slower than a frame rate of the video to make a viewer perceive the adjustment operation which is asynchronous with the display of the frame image.

A video system according to another aspect of the present invention comprises a display device for displaying a video to be stereoscopically perceived, and an eyeglass device for assisting in viewing the video, wherein the display device includes a transmitter configured to transmit a synchronization signal which synchronizes with display of a frame image of the video, the eyeglass device includes an optical filter portion which has a left filter configured to adjust a light amount to be transmitted to a left eye and a right filter configured to adjust a light amount to be transmitted to a right eye; and a controller configured to control adjustment operation of the light amount by the optical filter portion, and the controller switches a control mode of the optical filter portion between a first control mode of controlling the optical filter portion so that the adjustment operation becomes synchronized with the display of the frame image of the video, and a second control mode of controlling the optical filter portion so that the adjustment operation becomes slower than a frame rate of the video to make a viewer perceive the adjustment operation which is asynchronous with the display of the frame image.

DESCRIPTION OF THE INVENTION

Figure 1:
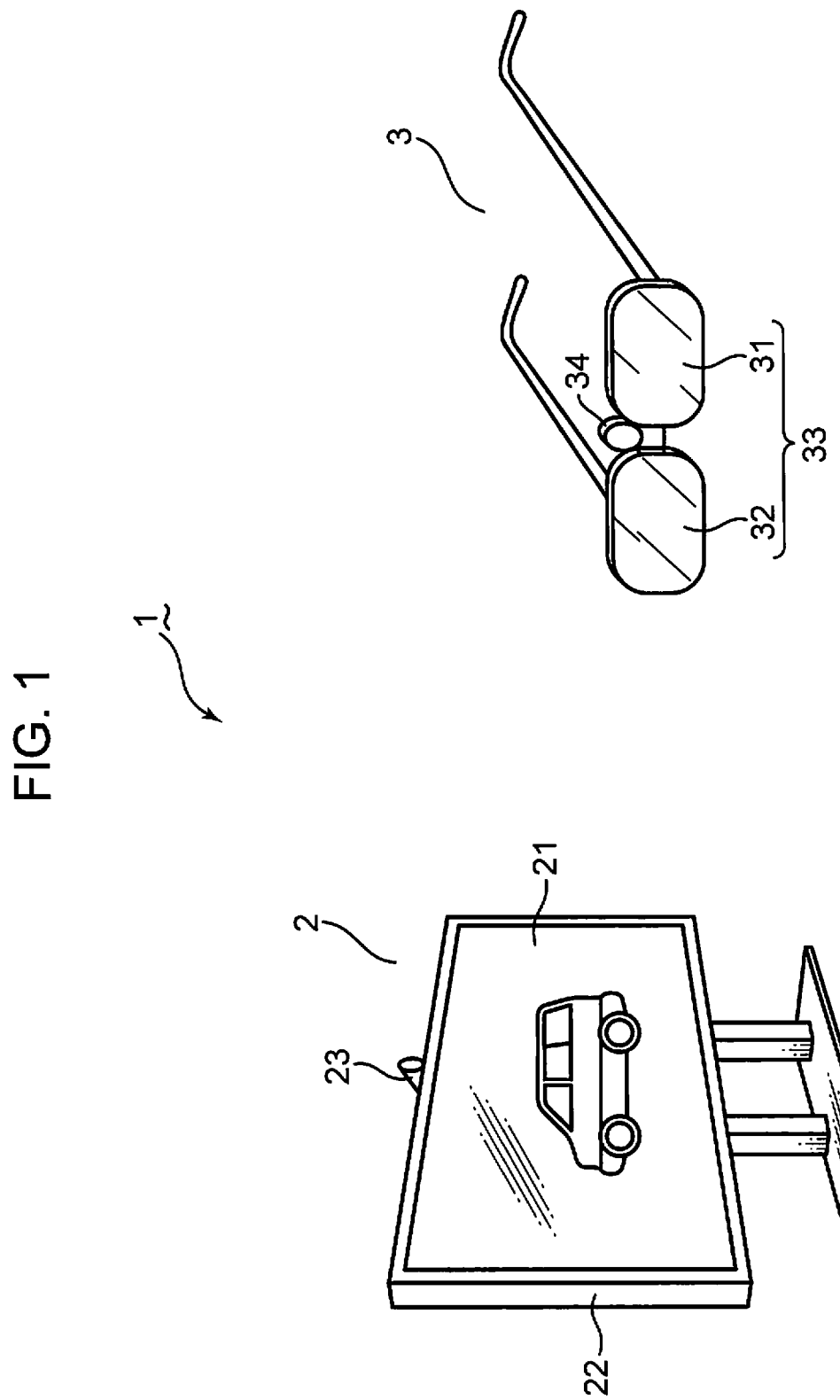
FIG. 1 is a schematic view of a video system according to one embodiment.

An eyeglass device and a video system according to one embodiment are described with reference to the accompanying drawings. It should be noted that configurations, arrangements or shapes depicted in the drawings and descriptions related to the drawings are merely for facilitating to understand principles of the eyeglass device and the video system, and are not intended to limit the principles of the eyeglass device and the video system in any way.

FIG. 1 schematically shows the video system. It should be noted that the video system shown in FIG. 1 is merely depicted to clarify the principles of the eyeglass device and the video system. The principles of the eyeglass device and the video system are not limited in any way by detailed structures, arrangements or shapes depicted in FIG. 1.

The video system 1 includes a display device 2 configured to display a video, and an eyeglass device 3 configured to perform stereoscopic visual assistance for allowing a viewer to stereoscopically perceive the video. The display device 2 includes a display panel 21 configured to display the video to be stereoscopically perceived. For example, a CRT display, a liquid crystal display, a PDP (plasma display panel), an organic electroluminescence display or another device configured to display a video may be suitably used as the display panel 21. The video displayed on the display panel 21 includes a left frame image, which is imaged or created so as to be viewed by the left eye, and a right frame image, which is imaged or created so as to be viewed by the right eye. In this embodiment, the left and right frame images are alternately displayed on the display panel 21. The eyeglass device 3 executes the stereoscopic visual assistance so that the viewer views the left frame image with the left eye and the right frame image with the right eye. Consequently, the viewer may three-dimensionally (stereoscopically) perceive the video displayed on the display panel 21. If the video is stereoscopically perceived, objects in the left and right frame images (image of the objects depicted in the left and right frame images) are perceived as if they pop out from or recede into the flat screen of the display panel 21.

A transmission device 23 is disposed on an upper edge of a housing 22 which surrounds the periphery of the display panel 21. The transmission device 23 is used as the transmitter configured to transmit a synchronization signal in synchronism with the display of the left and right frame images on the display panel 21. For example, an infrared light emitter, an RF transmitter or another element configured to transmit the synchronization signal may be suitably used as the transmission device 23.

The synchronization signal from the transmission device 23 is received by the eyeglass device 3. The eyeglass device 3 executes the aforementioned stereoscopic visual assistance in response to the received synchronization signal. Consequently, the viewer may view the left and right frame images displayed on the display panel 21 with the left and right eyes, repsectively.

The eyeglass device 3 generally looks like eyeglasses for correcting vision. The eyeglass device 3 comprises an optical filter portion 33 including a left filter 31 situated in front of the left eye of the viewer wearing the eyeglass device 3, and a right filter 32 situated in front of the right eye. The left and right filters 31, 32 are optical elements configured to adjust a light amount to be transmitted to the viewer's left and right eyes. Accordingly, shutter elements (for example, liquid crystal shutters) which open and close an optical path for transmitting light to the viewer's left and right eyes, deflection elements (for example, liquid crystal filters) which deflect the light to be transmitted to the viewer's left and right eyes, and other optical elements configured to adjust the light amount may be suitably used as the left and right filters 31, 32.

While the display panel 21 displays the left frame image, the left filter 31 allows light transmission to the viewer's left eye whereas the right filter 32 inhibits light transmission to the viewer's right eye. Consequently, the viewer may view the left frame image with the left eye. While the display panel 21 displays the right frame image, the right filter 32 allows the light transmission to the viewer's right eye whereas the left filter 31 inhibits the light transmission to the viewer's left eye. Consequently, the viewer may view the right frame image with the right eye. Under such stereoscopic visual assistance, the viewer may stereoscopically perceive the video displayed on the display panel 21.

The eyeglass device 3 includes a reception device 34 situated between the left and right filters 31, 32. The reception device 34 is used as a receiver of the synchronization signal, which is transmitted in synchronism with the display of the frame images of the video. The synchronization between the display of the frame images of the video and the stereoscopic visual assistance of the optical filter portion 33 is achieved by the reception device 34 receiving the synchronization signal from the transmission device 23. If an infrared light emitter is used as the transmission device 23, an infrared reception device may be suitably used as the reception device 34. If an RF transmitter is used as the transmission device 23, an RF receiver may be suitably used as the reception device 34. Alternatively, another element configured to receive the synchronization signal, which is transmitted by the transmission device 23, may be used as the reception device 34.

Figure 2:
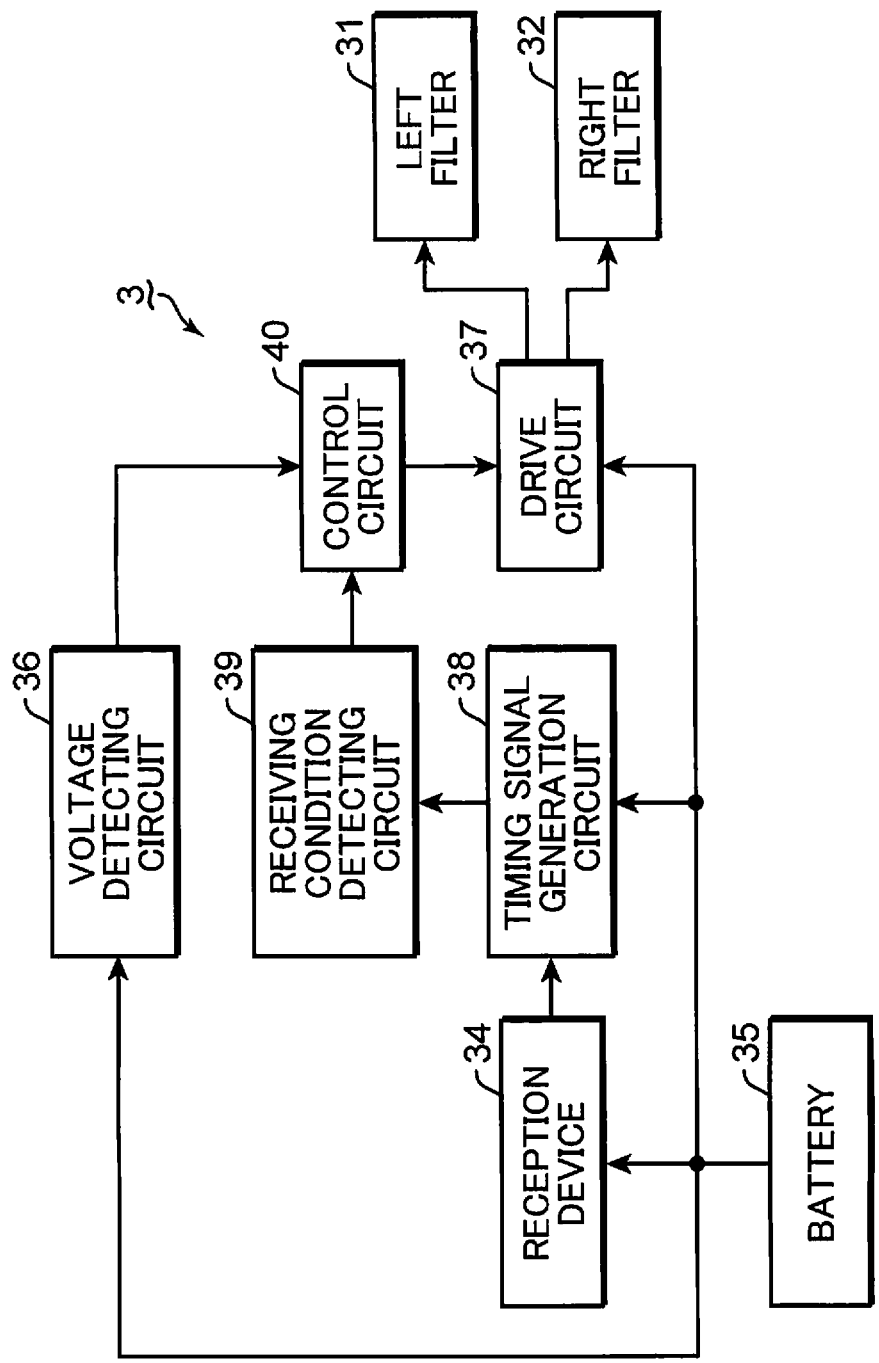
FIG. 2 is a block diagram schematically showing a hardware configuration of an eyeglass device of the video system depicted in FIG. 1.

FIG. 2 is a block diagram schematically showing a hardware configuration of the eyeglass device 3. The eyeglass device 3 is further described with reference to FIGS. 1 and 2.

The eyeglass device 3 includes a battery 35. The battery 35 is used as a power source of the eyeglass device 3, so that the battery 35 supplies power to various components of the eyeglass device 3 as described below. The eyeglass device 3 includes a voltage detecting circuit 36 configured to detect the voltage of the battery 35. The voltage detecting circuit 36 detects whether the detected voltage of the battery 35 is lower than a voltage threshold, which is defined for the voltage of the battery 35. The voltage detecting circuit 36 outputs failure information if the detected voltage of the battery 35 is lower than the voltage threshold. In the following descriptions, the failure information output by the voltage detecting circuit 36 is exemplified as the first failure information.

If the voltage of the battery 35 considerably decreases, for instance, the aforementioned adjustment operation of the light amount by the left and right filters 31, 32 may not follow and synchronize with the display of the frame images of the video on the display panel 21 even under appropriate reception of the synchronization signal by the reception device 34.

The voltage threshold is set to prevent such a failure in the left and right filters 31, 32. In this embodiment, the voltage detecting circuit 36 is exemplified as the detector configured to detect a failure factor, which inhibits the synchronization between the adjustment operation of the light amount by the left and right filters 31, 32 and the display of the frame image of the display panel 21.

In this embodiment, the voltage detecting circuit 36 directly detects the voltage of the battery 35. Alternatively, the voltage detecting circuit 36 may detect the voltage, which is applied to a drive circuit 37 described later. The voltage detecting circuit 36 may detect the voltage, which is applied to the drive circuit 37 configured to drive the left and right filters 31, 32, and then directly determine whether there is a sufficient voltage drop to affect the adjustment operation of the light amount by the left and right filters 31, 32. The phrase "detect the battery voltage" or similar phrases used in the following descriptions mean indirect detection for the voltage of the battery 35 such as detecting the voltage applied to other components, in addition to direct detection for the voltage from the battery 35. It should be noted that measurement of the voltage of the battery 35 or the voltage applied to the other components may be suitably performed by means of known voltage measurement methodologies.

The eyeglass device 3 includes a timing signal generation circuit 38 configured to generate a timing signal, which is used for setting a timing of the light amount adjustment by the left and right filters 31, 32. The left and right filters 31, 32 increase or decrease the light amount to be transmitted to the left and right eyes in response to the timing signal, which is generated by the timing signal generation circuit 38.

As described above, the reception device 34 receives the synchronization signal from the transmission device 23 to output an electric signal in response to the synchronization signal to the timing signal generation circuit 38. The timing signal generation circuit 38 generates the timing signal in response to the electric signal, which is output from the reception device 34. The timing signal is generated in synchronism with the synchronization signal, which is received by the reception device 34.

Unless the reception device 34 receives the synchronization signal from the transmission device 23, an electric signal is not output from the reception device 34 to the timing signal generation circuit 38. Meanwhile, the timing signal generation circuit 38 does not generate the timing signal in response to the synchronization signal. Alternatively, while the synchronization signal is not received, the timing signal generation circuit 38 may generate a simulated timing signal on the basis of the synchronization signal, which has been already acquired. In this case, even if the synchronization signal is momentarily not received, the timing of the light amount adjustment by the left and right filters 31, 32 may be appropriately determined.

The eyeglass device 3 includes a receiving condition detecting circuit 39. The timing signal generation circuit 38 outputs the timing signal to the receiving condition detecting circuit 39. Thereafter, the receiving condition detecting circuit 39 outputs the timing signal to a control circuit 40. Alternatively, if the aforementioned simulated timing signal is input from the timing signal generation circuit 38, the receiving condition detecting circuit 39 may output the simulated timing signal as the timing signal to the control circuit 40.

The receiving condition detecting circuit 39 measures an elapsed time after the input of the timing signal or the power supply from the battery 35 is started. Subsequently, if the timing signal is input, the receiving condition detecting circuit 39 measures an elapsed time from when the timing signal is input. Alternatively, the receiving condition detecting circuit 39 may measure a length of a period during which the aforementioned simulated timing signal is received. The receiving condition detecting circuit 39 repeats the aforementioned measurement to detect a non-reception period during which the synchronization signal is not received.

Unless the synchronization signal is received, the timings of the adjustment operation of the light amount by the left and right filters 31, 32 are not determined. Accordingly, the synchronization between the display of the frame images of the video on the display panel 21 and the stereoscopic visual assistance by the optical filter portion 33 is not effected. Even if the timing signal generation circuit 38 generates the timing signal on the basis of the previously received synchronization signal as described above, a long lasting non-reception period results in a gap between the display of frame images of the video on the display panel 21 and the stereoscopic visual assistance by the optical filter portion 33.

In order to detect such a failure (failure factor) of the light amount adjustment by the optical filter portion 33, the receiving condition detecting circuit 39 compares the non-reception threshold, which is defined for the non-reception period, with the detected non-reception period. If the non-reception period is longer than the non-reception threshold, the receiving condition detecting circuit 39 outputs failure information to the control circuit 40. In the following descriptions, the failure information output by the receiving condition detecting circuit 39 is exemplified as the second failure information.

The eyeglass device 3 includes the control circuit 40 configured to output a control signal for controlling the drive circuit 37, which drives the left and right filters 31, 32. The control circuit 40 generates a first control signal in response to the timing signal unless the failure information is input from the voltage detecting circuit 36 and the receiving condition detecting circuit 39. If the first failure information is input from the voltage detecting circuit 36, the control circuit 40 generates a second control signal on the basis of the first failure information. If the second failure information is input from the receiving condition detecting circuit 39, the control circuit 40 generates a third control signal on the basis of the second failure information. The first to third control signals are output to the drive circuit 37. There may be priority setting among the input signals to the control circuit 40. For example, the first failure information may be set as the highest priority. If the timing signal/second failure information and the first failure information are simultaneously input to the control circuit 40, the control circuit 40 may, for example, output the first failure information.

The drive circuit 37 drives the left and right filters 31, 32 in response to the first, second or third control signals. Preferably, the adjustment operation of the light amount by the left and right filters 31, 32 which is driven by the first control signal, the adjustment operation of the light amount by the left and right filters 31, 32 which is driven by the second control signal and the adjustment operation of the light amount by the left and right filters 31, 32 which is driven by the third control signal are different from each other.

Figure 3:
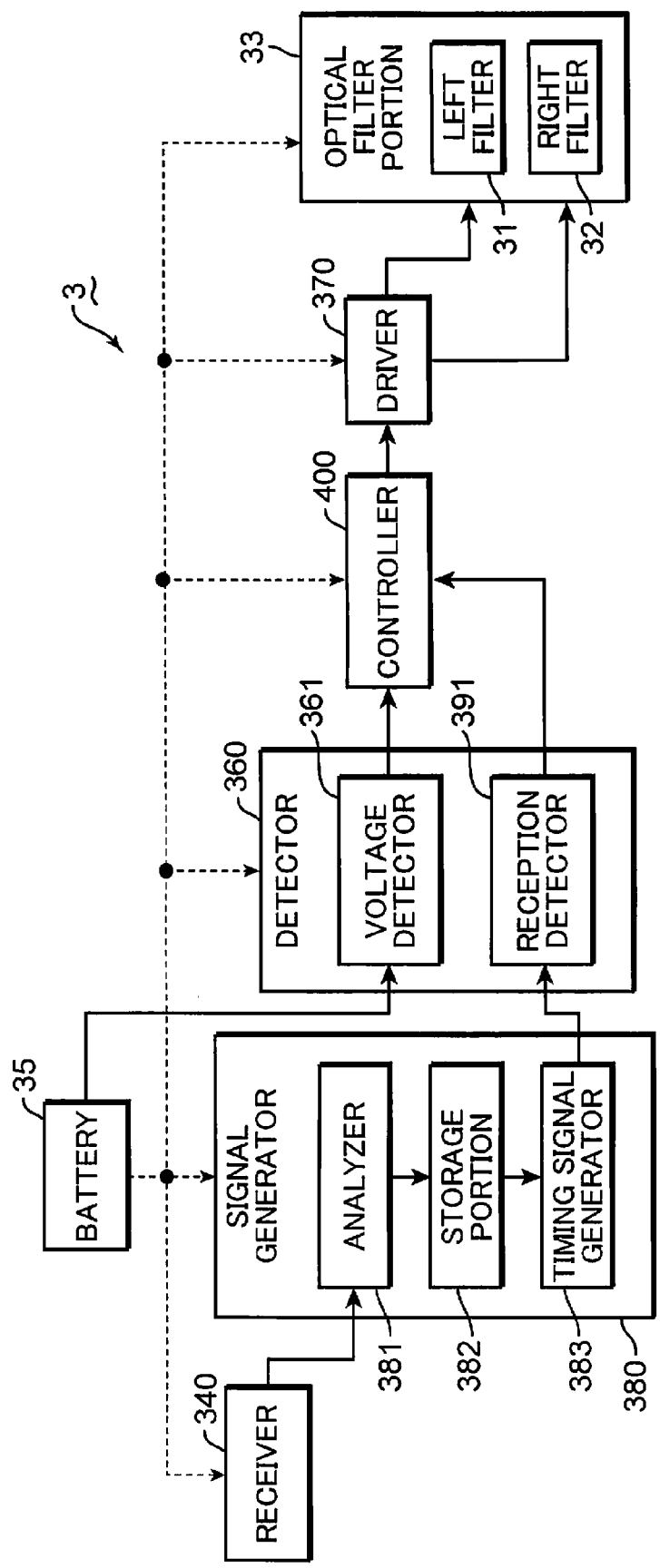
FIG. 3 is a block diagram schematically showing a functional configuration of the eyeglass device depicted in FIG. 2.

FIG. 3 is a block diagram schematically showing a functional configuration of the eyeglass device 3. The eyeglass device 3 is further described with reference to FIGS. 1 to 3.

The eyeglass device 3 includes a battery 35, a receiver 340 corresponding to the reception device 34 shown in FIGS. 1 and 2, a signal generator 380 corresponding to the timing signal generation circuit 38 shown in FIG. 2, a detector 360 corresponding to the voltage detecting circuit 36 and the receiving condition detecting circuit 39 shown in FIG. 2, a controller 400 corresponding to the control circuit 40 shown in FIG. 2, a driver 370 corresponding to the drive circuit 37 shown in FIG. 2, and an optical filter portion 33. As described with reference to FIG. 2, the battery 35 is used as the power source of the eyeglass device 3 to supply power to the receiver 340, the signal generator 380, the detector 360, the controller 400, the driver 370 and the optical filter portion 33.

The receiver 340 receives the synchronization signal as described above. The synchronization signal received by the receiver 340 is output as an electric signal to the signal generator 380. The signal generator 380 includes an analyzer 381, a storage portion 382 and a timing signal generator 383. The analyzer 381, for example, measures a reception interval of the synchronization signals, which are received by the receiver 340, analyzes a waveform of the synchronization signal and other synchronization information, which is required for synchronizing the optical filter portion 33 with the display of the frame images of the video on the display panel 21. The synchronization information obtained on the basis of the analysis of the synchronization signal by the analyzer 381 is stored in the storage portion 382. The timing signal generator 383 generates and outputs the timing signal to the detector on the basis of the synchronization information stored in the storage portion 382.

The detector 360 includes a voltage detector 361 corresponding to the voltage detecting circuit 36 described with reference to FIG. 2, and a reception detector 391 corresponding to the receiving condition detecting circuit 39. The timing signal generated by the timing signal generator 383 is input to the reception detector 391. Subsequently, the timing signal, which is input to the reception detector 391, is output to the controller 400. Unless the reception detector 391 receives a timing signal for a period, which is longer than the non-reception threshold, the second failure information representing a communication failure of the synchronization signal is output from the reception detector 391 to the controller 400.

The voltage detector 361 detects the voltage of the battery 35. If the detected voltage of the battery 35 is lower than the voltage threshold, the first failure information is output from the voltage detector 361 to the controller 400.

The first, second or third control signal is output from the controller 400 to the driver 370 on the basis of the timing signal, the first failure information or the second failure information, which is output from the detector 360. The driver drives the left and/or right filters 31, 32 of the optical filter portion 33 in response to the first, second or third control signal.

Figure 4:
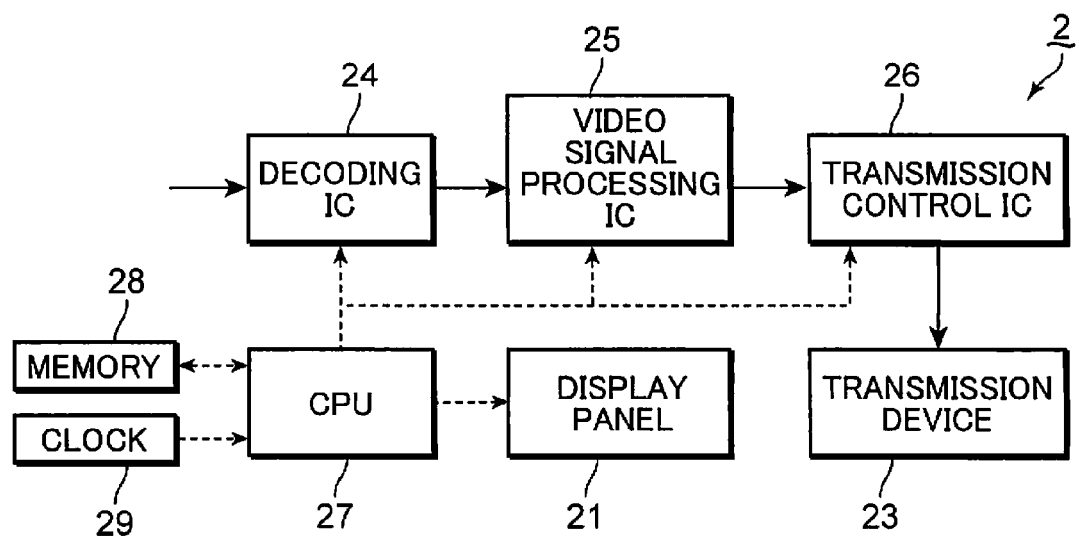
FIG. 4 is a block diagram schematically showing a hardware configuration of a display device of the video system depicted in FIG. 1.

FIG. 4 is a block diagram schematically showing a hardware configuration of the display device 2. The display device 2 is described with reference to FIGS. 1 and 4.

The display device 2 comprises a decoding IC 24, a video signal processing IC 25, a transmission control IC 26, a CPU 27, a memory 28, a clock 29, the display panel 21 and the transmission device 23.

An encoded video signal is input to the decoding IC 24 of the display device 2. The decoding IC 24 decodes the video signal to output the video data according to a predetermined format. MPEG (Motion Picture Experts Group)-2, MPEG-4 and H264 may be exemplified as the encoding methodologies of the video.

The video signal processing IC 25 performs signal processes related to the display of the stereoscopic video. The video signal processing IC 25 processes the video signal to display the video data from the decoding IC 24 as the stereoscopic video. Alternatively, the video signal processing IC 25 may detect the left and right frame images from the video data, which is decoded by the decoding IC 24. The detected left and right frame images are alternately displayed on the display panel 21. Alternatively, the left and right frame images may be automatically generated from the video data, which is output by the decoding IC 24. The video signal processing IC 25 may alternately output the generated left and right frame images to the display panel 21. The video signal processing IC 25 performs the signal processes related to the display of the stereoscopic video, and thereafter generates an output signal, which is compliant with a signal input method of the display panel 21.

It should be noted that the video signal processing IC 25 may execute other processes than the aforementioned processes. For example, the video signal processing IC 25 may adjust color tones of the displayed video according to characteristics of the display panel 21. The video signal processing IC 25 may interpolate images between frames of the video data, which is generated by the decoding IC 24, to increase a frame rate of the video.

The transmission control IC 26 generates a synchronization signal in synchronism with the left and right frame images which are generated by the video signal processing IC 25. Thereafter, the transmission control IC 26 outputs the generated synchronization signal to the transmission device 23.

The CPU 27, for example, controls various elements (for instance, the decoding IC 24 and the video signal processing IC 25) of the display device 2 according to programs recorded in the memory 28 and external inputs (not shown). The CPU 27 may thereby control the overall display device 2.

The memory 28 is used as a region for recording programs to be executed by the CPU 27 and temporary data generated during execution of the programs. A volatile RAM (Random Access Memory) or a nonvolatile ROM (Read Only Memory) may be exemplified as the memory 28.

The clock 29 supplies clock signals, which are used as operational references of the CPU 27 and other elements.

The video signal (left and right frame images) output from the video signal processing IC 25 is displayed on the display panel 21. The viewer wearing the eyeglass device 3 may stereoscopically perceive the frame images displayed on the display panel 21 under the stereoscopic visual assistance of the eyeglass device 3.

The transmission device 23 outputs the synchronization signal to the eyeglass device 3 under control of the transmission control IC 26. As described above, the eyeglass device 3 generates a timing signal in response to the synchronization signal and executes the stereoscopic visual assistance of the optical filter portion 33 in response to the generated timing signal.

Figure 5:
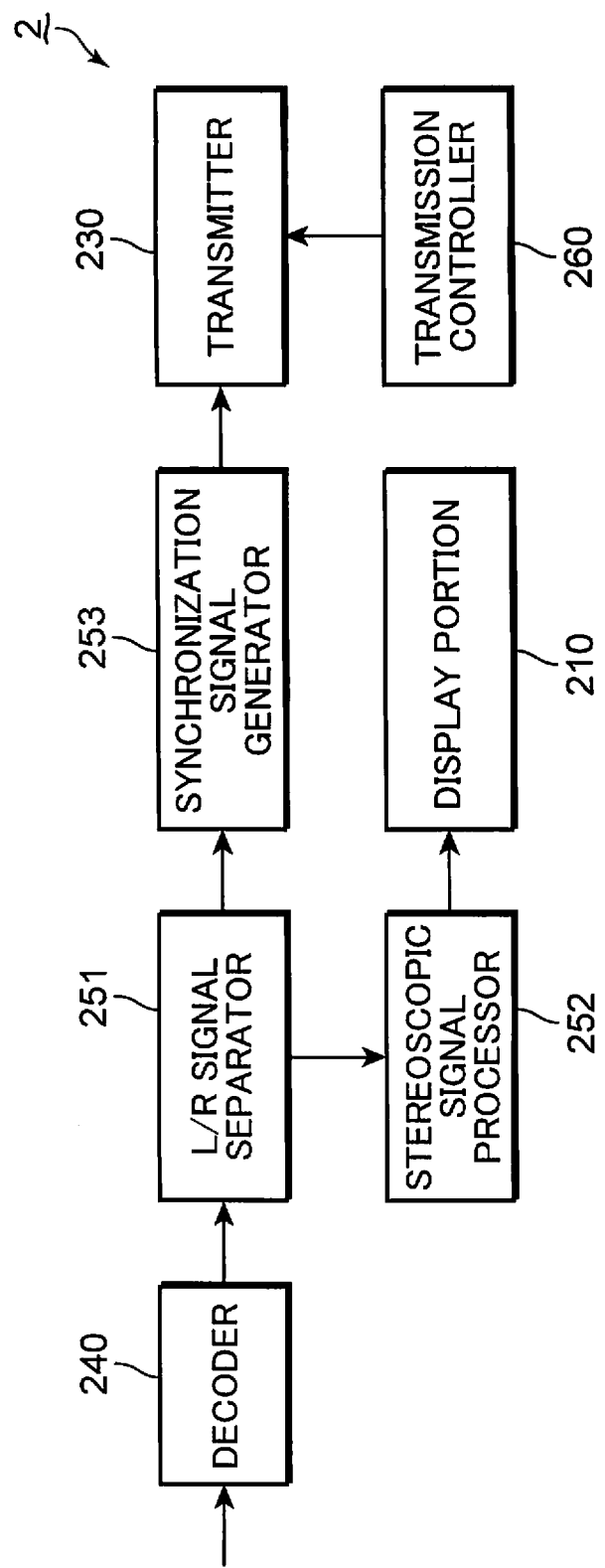
FIG. 5 is a block diagram schematically showing a functional configuration of the display device depicted in FIG. 4.

FIG. 5 is a block diagram schematically showing a functional configuration of the display device 2. The display device 2 is further described with reference to FIGS. 1, 4 and 5.

The display device 2 comprises a decoder 240, an L/R signal separator 251, a stereoscopic signal processor 252, a display portion 210, a synchronization signal generator 253, a transmission controller 260 and a transmitter 230.

An encoded video signal is input to the decoder 240 corresponding to the decoding IC 24 described with reference to FIG. 4. The decoder 240 decodes the input video signal.

The L/R signal separator 251 generates or separates the video signal for the left and right eyes (left and right frame images) from the video signal, which is decoded by the decoder 240.

The stereoscopic signal processor 252 adjusts the video, which is separated for the left and right eyes by the L/R signal separator 251, according to characteristics of the display portion 210 configured to display the video to be viewed with the eyeglass device 3. The stereoscopic signal processor 252 adjusts a parallax amount between the left and right frame images according to, for example, a size of the display screen of the display portion 210. It should be noted that the display portion 210 corresponds to the display panel 21 depicted in FIG. 1.

The synchronization signal generator 253 generates a synchronization signal in synchronism with or corresponding to the left and right frame images, which are generated by the L/R signal separator 251. The types (for example, waveform) or generation timings of the synchronization signals are adjusted according to characteristics of the display portion 210.

The L/R signal separator 251, the stereoscopic signal processor 252 and the synchronization signal generator 253 correspond to the video signal processing IC 25 in the hardware configuration described with reference to FIG. 4.

The display portion 210 displays the video signal, which is processed by the stereoscopic signal processor 252, as the video. As described above, the display portion 210 corresponds to the display panel 21 in the hardware configuration described with reference to FIG. 4.

The transmitter 230 transmits the synchronization signal, which is generated by the synchronization signal generator 253, to the eyeglass device 3 under the control of the transmission controller 260. The transmitter 230 corresponds to the transmission device 23 in the hardware configuration described with reference to FIG. 4.

The transmission controller 260 controls data amounts and transmission intervals of the synchronization signal to be transmitted. The transmission controller 260 corresponds to the transmission control IC 26 in the hardware configuration described with reference to FIG. 4.

(First Control Mode)

Figure 6:
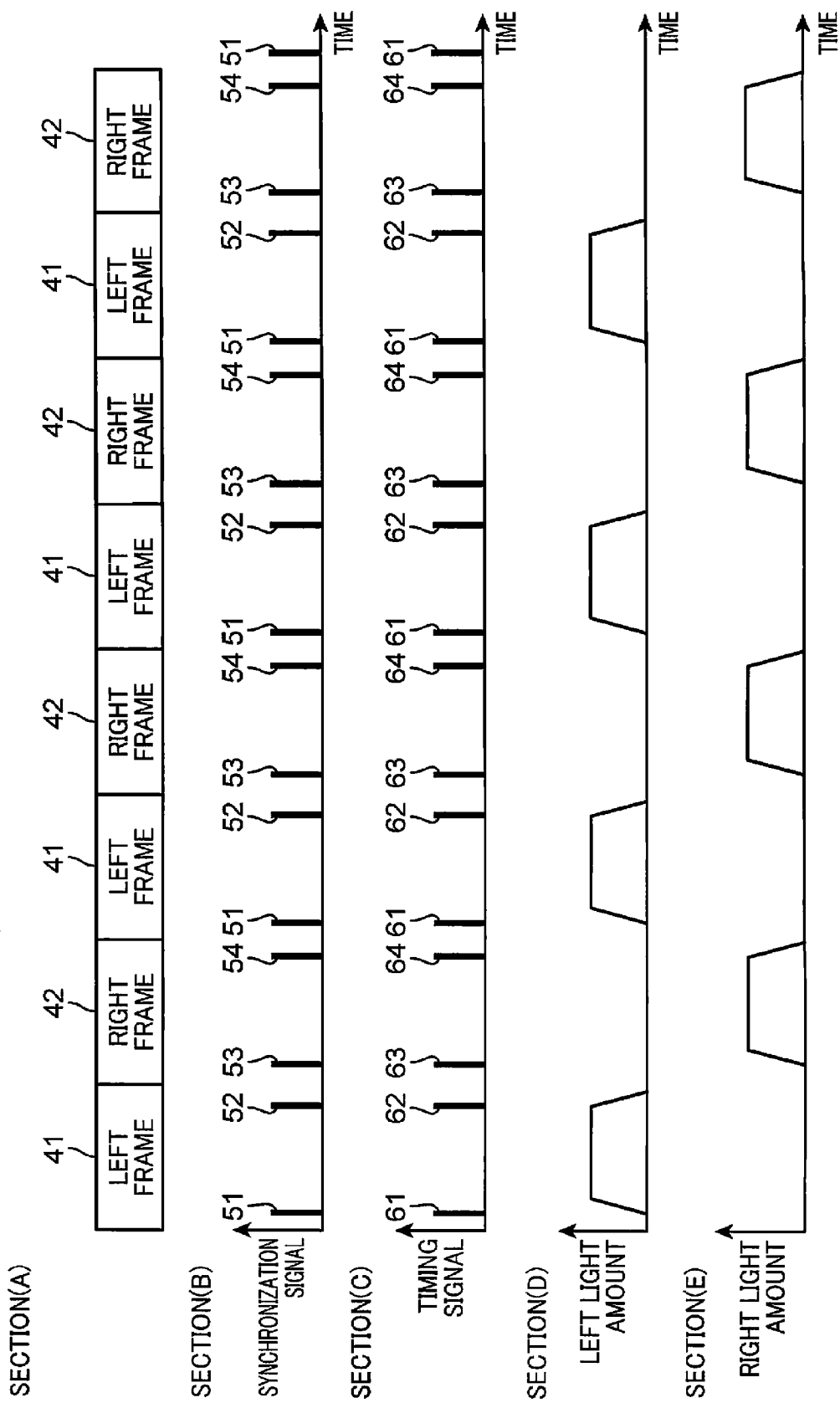
FIG. 6 is a timing chart schematically showing adjustment operation of an light amount by the optical filter portion while failure information is not output.

FIG. 6 is a timing chart representing the adjustment operation of the light amount by the optical filter portion 33 in response to the synchronization signal without failure information output by the detector 360. Section (A) of FIG. 6 shows frame images displayed by the display portion 210. Section (B) of FIG. 6 shows the synchronization signals transmitted from the transmitter 230. Section (C) of FIG. 6 shows the timing signals output by the timing signal generator 383. Section (D) of FIG. 6 shows the transmitted light amount to the left eye, which fluctuates in response to the adjustment operation of the light amount by the left filter 31. Section (E) of FIG. 6 shows the transmitted light amount to the right eye, which fluctuates in response to the adjustment operation of the light amount by the right filter 32. The adjustment operation of the light amount by the optical filter portion 33 is described with reference to FIGS. 3, 5 and 6. The control mode of the optical filter portion 33 described with reference to FIG. 6 is exemplified as the first control mode.

As shown in section (A) of FIG. 6, the display portion 210 alternately displays the left and right frame images 41, 42 to be viewed by the left and right eyes.

As shown in section (B) of FIG. 6, the synchronization signal generator 253 generates a first synchronization signal 51 in synchronism with the display start of the left frame image 41 or at a time delayed by a predetermined time period from the display start time of the left frame image 41. The synchronization signal generator 253 generates a second synchronization signal 52 in synchronism with the display end of the left frame image 41 or at a time advanced by a predetermined time period from the display end time of the left frame image 41. The synchronization signal generator 253 generates a third synchronization signal 53 in synchronism with the display start of the right frame image 42 or at a time delayed by a predetermined time period from the display start time of the right frame image 42. The synchronization signal generator 253 generates a fourth synchronization signal 54 in synchronism with the display end of the right frame image 42 or at a time advanced by a predetermined time period from the display end time of the right frame image 42. The transmitter 230 transmits the first to fourth synchronization signals 51, 52, 53 and 54 under the control of the transmission controller 260. For example, the first to fourth synchronization signals 51, 52, 53 and 54 may be different in waveform, respectively.

The receiver 340 receives the first to fourth synchronization signals 51, 52, 53 and 54. The analyzer 381 identifies the first to fourth synchronization signals 51, 52, 53 and 54 on the basis of the waveforms of the first to the fourth synchronization signals 51, 52, 53 and 54, respectively. Synchronization information such as the waveforms and reception intervals of the first to fourth synchronization signals 51, 52, 53 and 54 is stored in the storage portion 382.

In synchronism with the first synchronization signal 51, the timing signal generator 383 generates a first timing signal 61 on the basis of the synchronization information stored in the storage portion 382 to define a timing at which the left filter 31 allows the light transmission. Similarly, in synchronism with the second synchronization signal 52, the timing signal generator 383 generates a second timing signal 62 to define a timing at which the left filter 31 inhibits the light transmission. In addition, in synchronism with the third synchronization signal 53, the timing signal generator 383 generates a third timing signal 63 to define a timing at which the right filter 32 allows the light transmission. Similarly, in synchronism with the fourth synchronization signal 54, the timing signal generator 383 generates a fourth timing signal 64 to define a timing at which the right filter 32 inhibits the light transmission. For example, the first to fourth timing signals 61, 62, 63 and 64 may be different in waveform, respectively.

The first to fourth timing signals 61, 62, 63 and 64 are output to the controller 400 via the reception detector 391. The controller 400 identifies the control contents, for example, on the basis of the waveforms of the first to fourth timing signals 61, 62, 63 and 64, and then the control signals which correspond to the first to fourth timing signals 61, 62, 63 and 64, respectively, are output from the controller 400 to the driver 370. The driver 370 drives the left and right filters 31, 32 in response to the input control signals.

Consequently, the left filter 31 performs the adjustment operation in synchronism with the first synchronization signal 51 so that the left filter 31 increases the light amount to be transmitted to the left eye. Subsequently the left filter 31 performs the adjustment operation in synchronism with the second synchronization signal 52 so that the left filter 31 decreases the light amount to be transmitted to the left eye. Similarly, the right filter 32 performs the adjustment operation in synchronism with the third synchronization signal 53 so that the right filter 32 increases the light amount to be transmitted to the right eye. Subsequently the right filter performs the adjustment operation in synchronism with the fourth synchronization signal 54 so that the right filter 32 decreases the light amount to be transmitted to the right eye. Consequently, the viewer may stereoscopically perceive the video displayed on the display portion 210.

(Second Control Mode)

Figure 7:
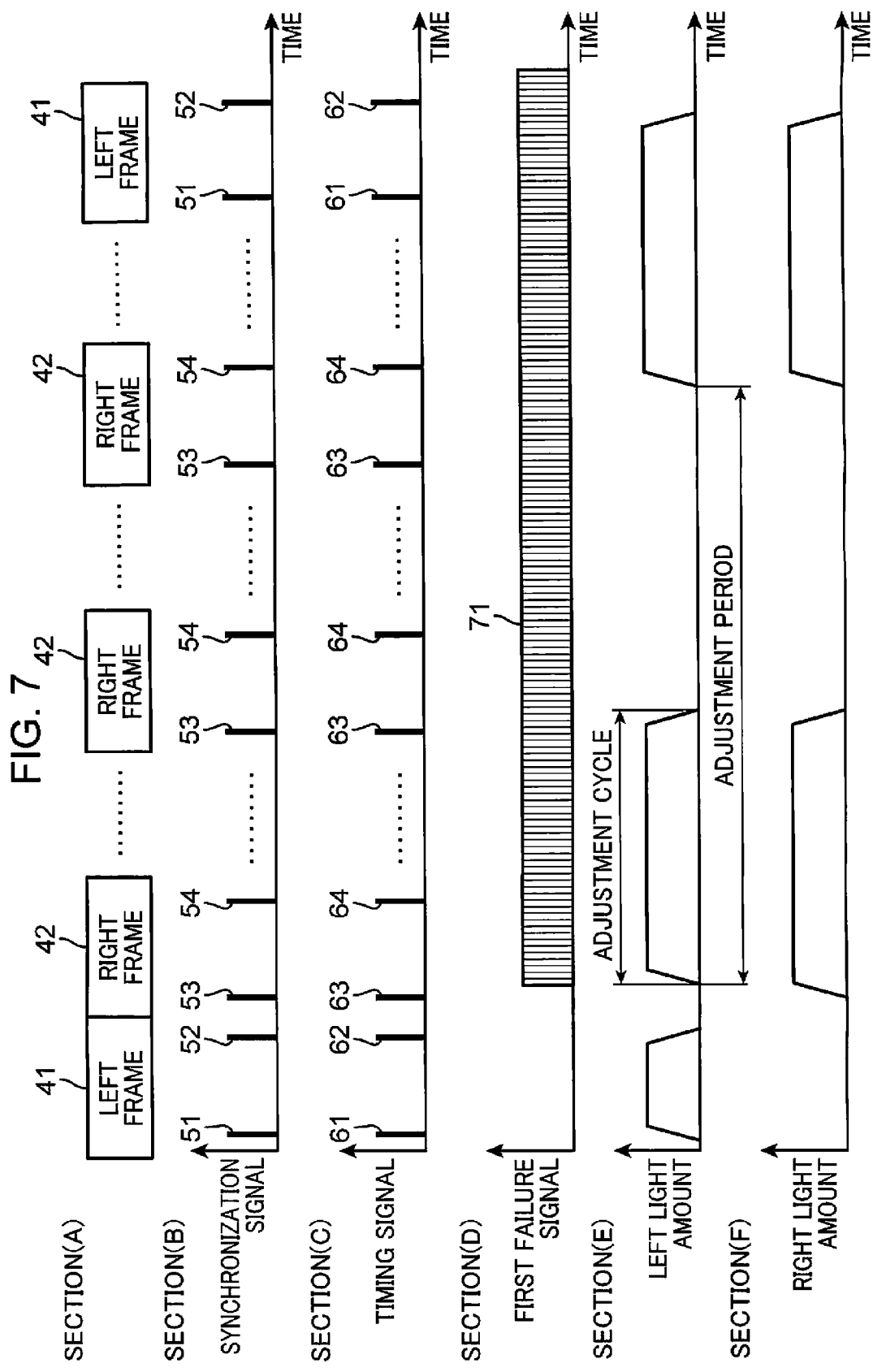
FIG. 7 is a timing chart schematically showing the adjustment operation of the light amount by the optical filter portion when the battery voltage decreases.

FIG. 7 is a timing chart showing the adjustment operation of the light amount by the optical filter portion 33 with a first failure signal representing the first failure information output by the voltage detector 361 of the detector 360. Section (A) of FIG. 7 shows the frame images displayed on the display portion 210. Section (B) of FIG. 7 shows the synchronization signals transmitted from the transmitter 230. Section (C) of FIG. 7 shows the timing signals output by the timing signal generator 383. Section (D) of FIG. 7 shows the first failure signal output by the voltage detector 361. Section (E) of FIG. 7 shows the transmitted light amount to the left eye, which fluctuates in response to the adjustment operation of the light amount by the left filter 31. Section (F) of FIG. 7 shows the transmitted light amount to the right eye, which fluctuates in response to the adjustment operation of the light amount by the right filter 32. The adjustment operation of the light amount by the optical filter portion 33 is further described with reference to FIG. 3 and FIGS. 5 to 7. The control mode of the optical filter portion 33 described with reference to FIG. 7 is exemplified as the second control mode.

Like the frame image display described with reference to section (A) of FIG. 6, the display portion 210 alternately displays the left and right frame images 41, 42 to be viewed by the left and right eyes, respectively.

Like the synchronization signal generation described with reference to section (B) of FIG. 6, the synchronization signal generator 253 generates a first synchronization signal 51 in synchronism with the display start of the left frame image 41 or at a time delayed by a predetermined time period from the display start time of the left frame image 41. The synchronization signal generator 253 generates a second synchronization signal 52 in synchronism with the display end of the left frame image 41 or at a time advanced by a predetermined time period from the display end time of the left frame image 41. The synchronization signal generator 253 generates a third synchronization signal 53 in synchronism with the display start of the right frame image 42 or at a time delayed by a predetermined time period from the display start time of the right frame image 42. The synchronization signal generator 253 generates a fourth synchronization signal 54 in synchronism with the display end of the right frame image 42 or at a time advanced by a predetermined time period from the display end time of the right frame image 42. The transmitter 230 transmits the first to fourth synchronization signals 51, 52, 53 and 54 under the control of the transmission controller 260. For example, the first to fourth synchronization signals 51, 52, 53 and 54 may be different in waveform, respectively.

The receiver 340 receives the first to fourth synchronization signals 51, 52, 53 and 54. The analyzer 381 identifies the first to fourth synchronization signals 51, 52, 53 and 54 on the basis of the waveforms of the first to fourth synchronization signals 51, 52, 53 and 54, respectively. Synchronization information such as the waveforms and reception intervals of the first to fourth synchronization signals 51, 52, 53 and 54 is stored in the storage portion 382.

Like the timing signal generation described with reference to section (C) of FIG. 6, in synchronism with the first synchronization signal 51, the timing signal generator 383 generates a first timing signal 61 on the basis of the synchronization information stored in the storage portion 382 to define a timing at which the left filter 31 allows the light transmission. Similarly, in synchronism with the second synchronization signal 52, the timing signal generator 383 generates a second timing signal 62 to define a timing at which the left filter 31 inhibits the light transmission. In addition, in synchronism with the third synchronization signal 53, the timing signal generator 383 generates a third timing signal 63 to define a timing at which the right filter 32 allows the light transmission. Similarly, in synchronism with the fourth synchronization signal 54, the timing signal generator 383 generates a fourth timing signal 64 to define a timing at which the right filter 32 inhibits the light transmission. For example, the first to fourth timing signals 61, 62, 63 and 64 may be different in waveform, respectively.

If the voltage detector 361 detects that the voltage of the battery 35 is lower than the voltage threshold, the detector 360 outputs a first failure signal 71 representing the first failure information, instead of outputting the timing signal from the reception detector 391. The detector 360 continues to output the first failure signal 71 while the voltage of the battery 35 remains lower than the voltage threshold.

The controller 400, which receives the input of the first failure signal 71, outputs a control signal toward the driver 370 so that the left and right filters 31, 32 execute the light amount adjustment, for example, at an adjustment frequency of 0.5 Hz or more and 40 Hz or less; more preferably an adjustment frequency that is less than half the frame rate of the video. The driver 370 drives the left and right filters 31, 32 in response to the control signal which is generated on the basis of the first failure signal 71.

In this embodiment, the adjustment operation of the light amount from when the light amount passing through the left and right filters 31, 32 reaches a maximum value from a minimum value to when the light amount returns once again to the minimum value is defined as one adjustment cycle. The period from one adjustment cycle to the subsequent adjustment cycle is defined as the adjustment period. The inverse of the adjustment period is defined as the adjustment frequency. It should be noted that, in one adjustment period, the time period while the light amount passing through the left and right filters 31, 32 is maximized is substantially equivalent to the time period while the light amount passing through the left and right filters 31, 32 is minimized.

The adjustment frequency of the light amount adjustment of the left and right filters 31, 32 in response to the first failure signal shown in FIG. 7 is 0.5 Hz or more and 40 Hz or less, more preferably less than half the frame rate of the video displayed on the display portion 210. If the adjustment frequencies of the light amount adjustments of the left and right filters 31, 32 are set to be in a range, which are less than half the frame rate of the video, for example, the adjustment frequencies of the light amount adjustments of the left and right filters 31, 32, may become less than 30 Hz, respectively, under 120 Hz of the video frame rate (left frame image: 60 Hz; right frame image: 60 Hz).

Under the control on the basis of the first failure signal 71 shown in FIG. 7, the left and right filters 31, 32 execute the light amount adjustment at an adjustment frequency of, for example, 0.5 Hz or more and 40 Hz or less, more preferably less than half the frame rate of the video. As a result of the left and right filters 31, 32 executing the light amount adjustment at an adjustment frequency of the lower range as described above, it becomes likely that a viewer wearing the eyeglass device 3 visually captures the operation of the left and right filters 31, 32 to figure out that a failure has occurred in the eyeglass device 3. If the left and right filters 31 32 execute the light amount adjustment at an adjustment frequency which exceeds 40 Hz, the operation of the left and right filters 31, 32 becomes too fast for the viewer to visually capture the operation of the left and right filters 31, 32. If the left and right filters 31, 32 execute the light amount adjustment at an adjustment frequency which is less than 0.5 Hz, the operation of the left and right filters 31, 32 becomes too slow for the viewer to visually capture the operation of the left and right filters 31, 32.

As shown in FIG. 7, in this embodiment, the left and right filters 31, 32 substantially simultaneously increase and decrease the transmitted light amount in response to the first failure signal 71.

Figure 8:
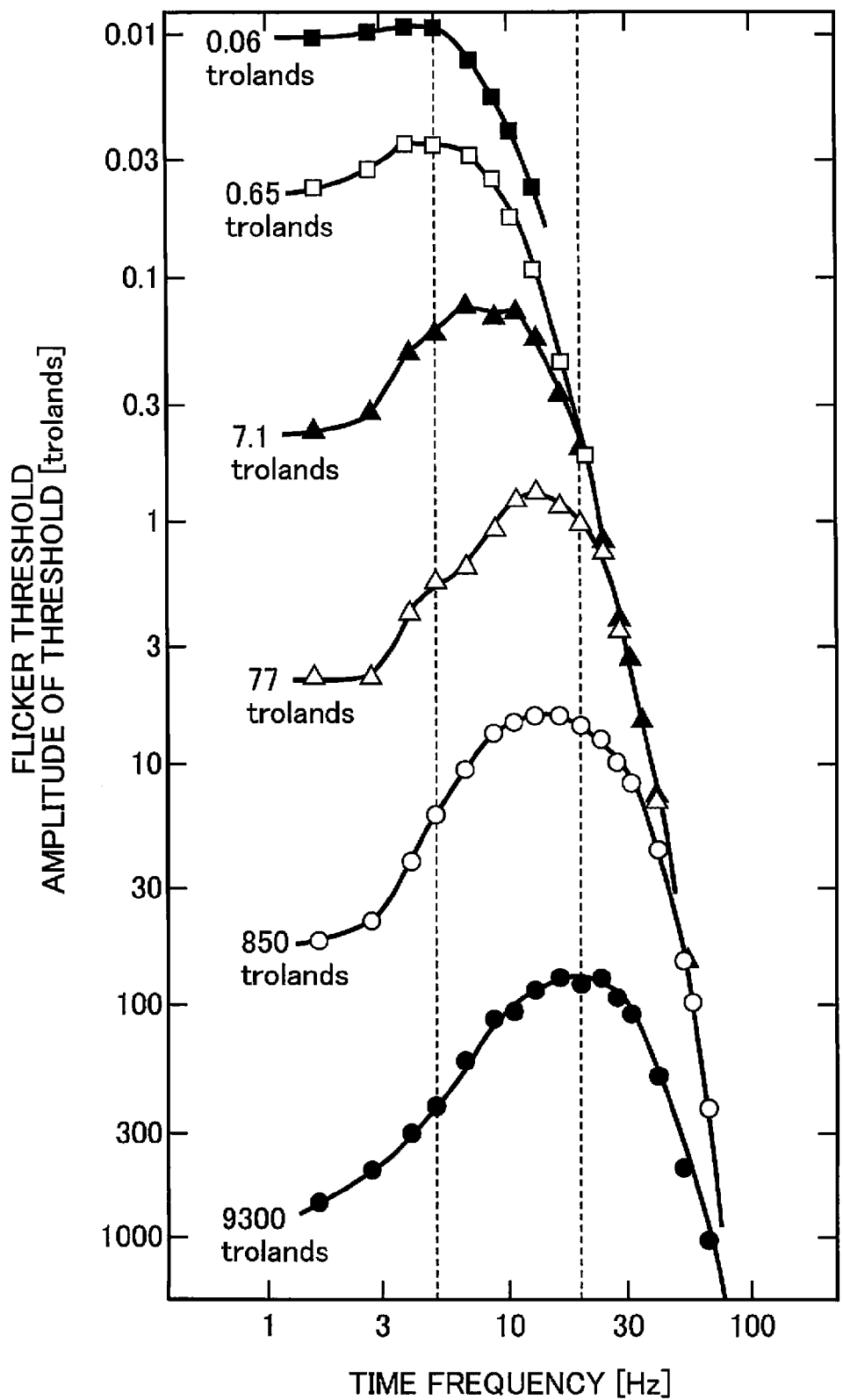
FIG. 8 is a graph showing a frequency band where human beings can perceive flickering.

FIG. 8 is a graph showing a frequency range in which human beings perceive flickering (Harashima: *gazo joho attushuku* (Image Information Compression) (Ohmsha, Ltd.) FIG. 2.9 (Kelly, 1961)). A preferred range of the adjustment frequency in the second control mode is described with reference to FIG. 8.

The horizontal axis of the graph shown in FIG. 8 represents the frequency. The vertical axis of the graph shown in FIG. 8 represents the threshold ("Trolands (brightness on the retina)" in FIG. 8) of the flickering which is perceivable for human beings.

According to the graph of FIG. 8, as the average brightness decreases, the peak position of the threshold moves toward a low frequency band. Under a standard environment of the video system 1, if the optical filter portion 33 is operated at an adjustment frequency of 0.5 Hz or more and 40 Hz or less, a human being feels that the video displayed on the display device 2 flickers. It is likely that most of people perceive flickering if the adjustment frequency is in the range of 0.5 Hz or more and less than 30 Hz although the range of the adjustment frequency, in which flickering is perceived, is different among people. It should be noted that, according to the graph of FIG. 8, since the peak frequency where people in general sense flickering under various average brightness is in the range of 5 Hz or more and 20 Hz or less, preferably, the adjustment frequency is set in the range of 5 Hz or more and 20 Hz or less.

The adjustment frequency in the second control mode may be set to satisfy the following conditions.

(1) The adjustment frequency is lower than the frame rate of the video (2) Be asynchronous with the display of the frame images.

(3) The viewer perceives flickering caused by the adjustment operation of the optical filter portion.

Figure 9:
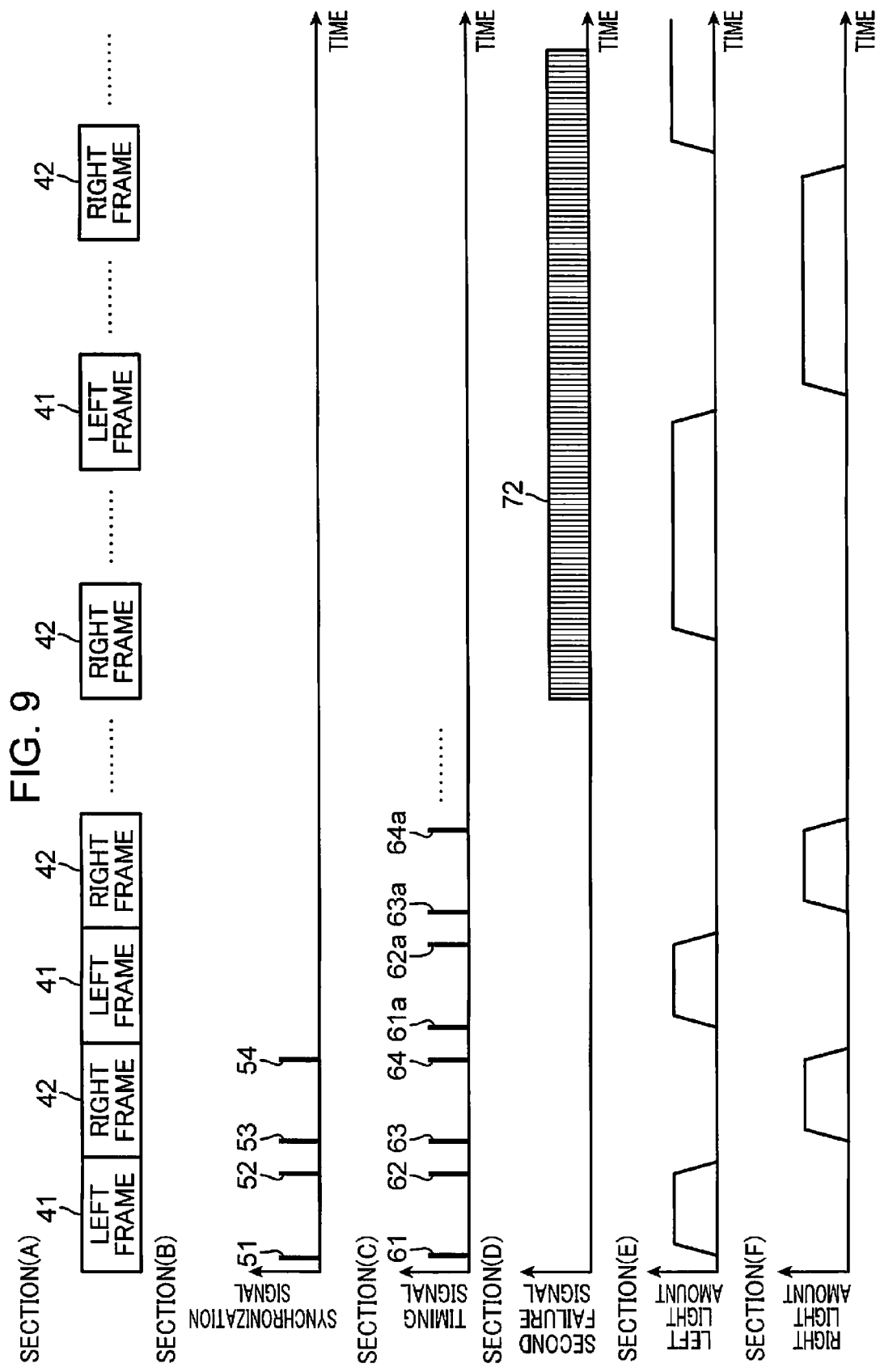
FIG. 9 is a timing chart schematically showing the adjustment operation of the light amount by the optical filter portion when there is a communication failure of the synchronization signal.

FIG. 9 is a timing chart showing the adjustment operation of the light amount by the optical filter portion 33 with the second failure signal representing the second failure information, which is output by the reception detector 391 of the detector 360. Section (A) of FIG. 9 shows frame images displayed on the display portion 210. Section (B) of FIG. 9 shows the synchronization signals transmitted from the transmitter 230. Section (C) of FIG. 9 shows the timing signals output by the timing signal generator 383. Section (D) of FIG. 9 shows the second failure signal output by the reception detector 391. Section (E) of FIG. 9 shows the transmitted light amount to the left eye, which fluctuates in response to the adjustment operation of the light amount by the left filter 31. Section (F) of FIG. 9 shows the transmitted light amount to the right eye, which fluctuates in response to the adjustment operation of the light amount by the right filter 32. The adjustment operation of the light amount by the optical filter portion 33 is further described with reference to FIG. 3 and FIGS. 5 to 9. The control mode of the optical filter portion 33 described with reference to FIG. 9 exemplified as the second control mode.

Like the display of the frame images described with reference to section (A) of FIG. 6, the display portion 210 alternately displays the left and right frame images 41, 42 to be viewed by the left and right eyes, respectively.

Like the synchronization signal generation described with reference to section (B) of FIG. 6, the synchronization signal generator 253 generates a first synchronization signal 51 in synchronism with the display start of the left frame image 41 or at a time delayed by a predetermined time period from the display start time of the left frame image 41. The synchronization signal generator 253 generates a second synchronization signal 52 in synchronism with the display end of the left frame image 41 or at a time advanced by a predetermined time period from the display end time of the left frame image 41. The synchronization signal generator 253 generates a third synchronization signal 53 in synchronism with the display start of the right frame image 42 or at a time delayed by a predetermined time period from the display start time of the right frame image 42. The synchronization signal generator 253 generates a fourth synchronization signal 54 in synchronism with the display end of the right frame image 42 or at a time advanced by a predetermined time period from the display end time of the right frame image 42. The transmitter 230 sends the first to fourth synchronization signals 51, 52, 53 and 54 under the control of the transmission controller 260. For example, the first to fourth synchronization signals 51, 52, 53 and 54 are different in waveform, respectively.

The receiver 340 receives the first to fourth synchronization signals 51, 52, 53 and 54. The analyzer 381 identifies the first to fourth synchronization signals 51, 52, 53 and 54 on the basis of the waveforms of the first to fourth synchronization signals 51, 52, 53 and 54, respectively. Synchronization information such as the waveforms and reception intervals of the first to fourth synchronization signals 51, 52, 53 and 54 is stored in the storage portion 382.

Like the timing signal generation described with reference to section (C) of FIG. 6, in synchronism with the first synchronization signal 51, the timing signal generator 383 generates a first timing signal 61 on the basis of the synchronization information stored in the storage portion 382 to define a timing at which the left filter 31 allows the light transmission. Similarly, in synchronism with the second synchronization signal 52, the timing signal generator 383 generates a second timing signal 62 to define a timing at which the left filter 31 inhibits the light transmission. In addition, in synchronism with the third synchronization signal 53, the timing signal generator 383 generates a third timing signal 63 to define a timing at which the right filter 32 allows the light transmission. Similarly, in synchronism with the fourth synchronization signal 54, the timing signal generator 383 generates a fourth timing signal 64 to define a timing at which the right filter 32 inhibits the light transmission. For example, the first to fourth timing signals 61, 62, 63 and 64 are different in waveform, respectively.

As shown in section (C) of FIG. 9, even in a predetermined period without reception of the first to fourth synchronization signals 51, 52, 53 and 54 by the receiver 340, the timing signal generator 383 may read the synchronization information, which has been acquired on the basis of the previously received first to fourth synchronization signals 51, 52, 53 and 54, from the storage portion 382, so that the timing signal generator 383 generates simulated timing signals 61a, 62a, 63a, 64a. The signal waveforms of the simulated timing signals 61a, 62a, 63a, 64a may be different from the waveforms of the timing signals 61, 62, 63, 64, which have been generated in response to the first to fourth synchronization signals 51, 52, 53 and 54 that have been taken in real time.

The reception detector 391 receiving the input of the simulated timing signals 61a, 62a, 63a, 64a may identify that the simulated timing signals 61a, 62a, 63a, 64a are input, on the basis of the signal waveforms of the simulated timing signals 61a, 62a, 63a, 64a. The reception detector 391 starts measuring a time period during which the simulated timing signals 61a, 62a, 63a, 64a are input. The measured period corresponds to the non-reception period during which the first to fourth synchronization signals 51, 52, 53 and 54 are not received. During the threshold period (that is, the non-reception threshold) defined for the time period, during which the simulated timing signals 61a, 62a, 63a, 64a are input, the reception detector 391 may change the waveform of the simulated timing signals 61a, 62a, 63a and 64a back into the waveform of the normal timing signals 61, 62, 63 and 64 to notify the timing of the adjustment operation of the light amount by the left and right filters 31, 32 to the controller 400. The controller 400 controls the driver 370 according to the input from the reception detector 391.

If the input period of the simulated timing signals 61a, 62a, 63a, 64a exceed the non-reception threshold, the second failure signal 72 representing the second failure information is output from the reception detector 391 to the controller 400, instead of the timing information of the adjustment operation of the light amount. The reception detector 391 continues to output the second failure signal 72 while the first to fourth synchronization signals 51, 52, 53 and 54 are not received. It should be noted that the second failure signal 72 is different in waveform from the first failure signal 71.

A control signal for executing the light amount adjustment of the left and right filters 31, 32 at an adjustment frequency, which is less than half the frame rate of the video, is output to the driver 370 from the controller 400, which receives the input of the second failure signal 72. The driver 370 drives the left and right filters 31, 32 in response to the control signal generated on the basis of the second failure signal 72.

Under the control on the basis of the second failure signal 72 shown in FIG. 9, the left and right filters 31, 32 execute the light amount adjustment at an adjustment frequency of, for example, 0.5 Hz or more and 40 Hz or less. As a result of the left and right filters 31, 32 executing the light amount adjustment at an adjustment frequency of a low range as described above, it becomes likely that the viewer wearing the eyeglass device 3 visually captures the operation of the left and right filters 31, 32 to comprehend that there is a failure in the eyeglass device 3. If the left and right filters 31, 32 execute the light amount adjustment at an adjustment frequency which exceeds 40 Hz, the operation of the left and right filters 31, 32 is too fast for the viewer to visually capture the operation of the left and right filters 31, 32. If the left and right filters 31, 32 execute the light amount adjustment at an adjustment frequency which is less than 0.5 Hz, the operation of the left and right filters 31, 32 is too slow for the viewer to visually capture the operation of the left and right filters 31, 32. It should be noted that the adjustment frequency may be suitably determined according to the conditions described with reference to FIG. 8.

As shown in FIG. 9, in this embodiment, the left and right filters 31, 32 alternately increase and decrease the transmitted light amount in response to the second failure signal 72. Thus the adjustment operation of the light amount by the left and right filters 31, 32 under the control based on the first failure signal 71 becomes different from the adjustment operation of the light amount by the left and right filters 31, 32 under the control based on the second failure signal 72, so that the viewer may identify whether the failure is caused by low battery power or a communication failure of the synchronization signal. Alternatively, the adjustment operation of the light amount by the left and right filters 31, 32 under the control based on the second failure signal 72 may be what is described with reference to FIG. 7 whereas the adjustment operation of the light amount adjustment operation by the left and right filters 31, 32 under the control based on the first failure signal 71 may be what is described with reference to FIG. 9. Alternatively, other adjustment operations of the light amount may be used as long as the viewer visually identifies differences between the adjustment operations of the light amount by the left and right filters 31, 32 under the controls based on the first and second failure signals 71, 72.

(Adjustment Frequency)

Figure 10:
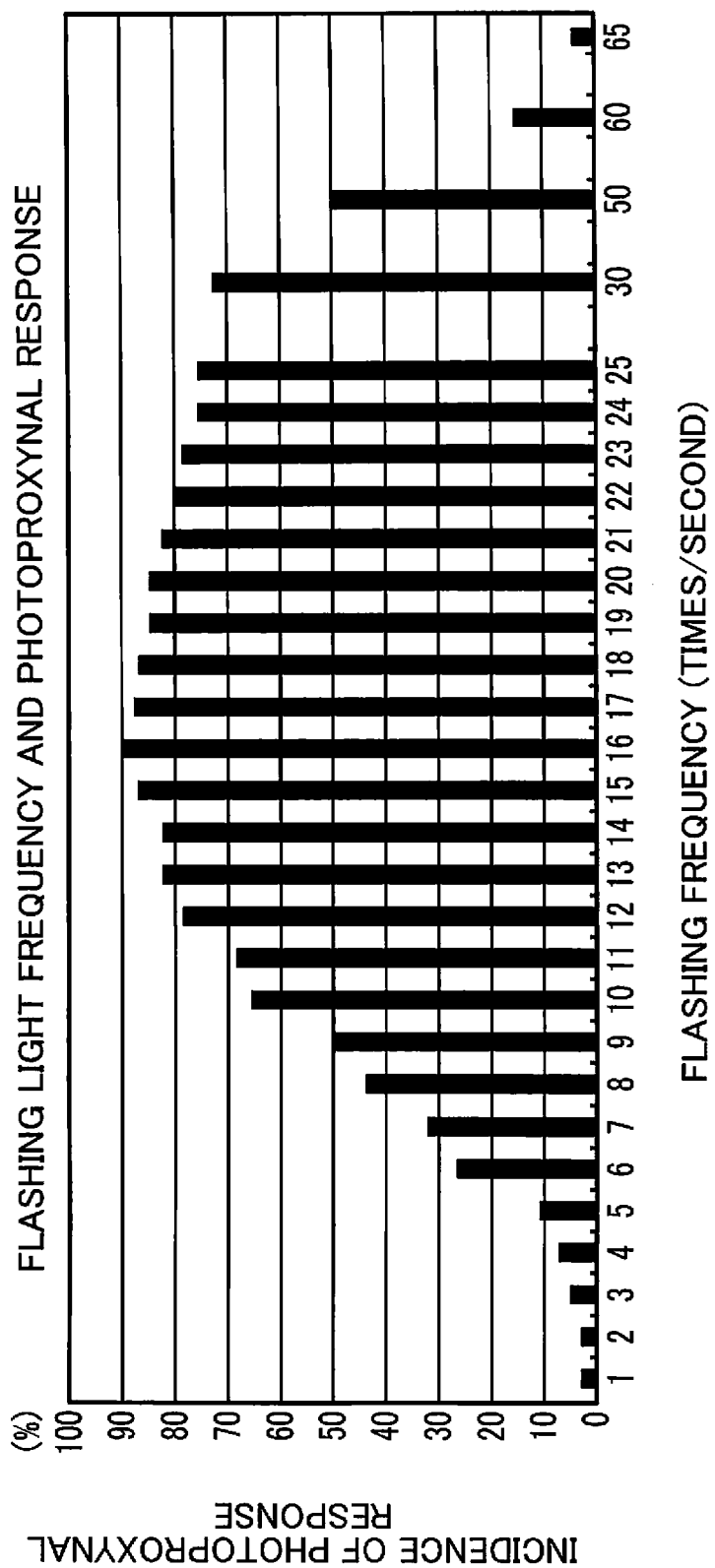
FIG. 10 is a histogram showing a relationship between a flashing light frequency and photoparoxysmal response.

FIG. 10 is a histogram representing a relationship between flashing light frequencies and the photoparoxysmal responses (G. F. A. Harding, P. M. Jeavors, Photosensitive Epilepsy p. 87). FIG. 10 shows results of an electroencephalographic examination based on flashing light stimulation, which was performed to 170 test subjects. The vertical axis of the histogram shown in FIG. 10 shows a ratio of the test subjects suffered from photoparoxysmal responses to flashing of different frequencies. The adjustment frequency of the left and right filters 31, 32 is described with reference to FIGS. 7, 9 and 10.

As described with reference to FIGS. 7 and 9, the left and right filters 31, 32 perform the light amount adjustment at an adjustment frequency of 0.5 Hz or more and 40 Hz or less in response to the first or second failure signal 71, 72. Considering the relationship between the flashing light frequencies and the photoparoxysmal responses shown in FIG. 10, it is preferable that the left and right filters 31, 32 perform the adjustment operation of the light amount at an adjustment frequency of 0.5 Hz or more and less than 5 Hz if the first or second failure signal 71, 72 is generated.

(Other Information Communicated from Eyeglass Device)

In the aforementioned embodiments, failures in the eyeglass device 3 are notified to the viewer by the left and right filters 31, 32 performing the light amount adjustment at an adjustment frequency of 0.5 Hz or more and 40 Hz or less. Alternatively other information than the failures of the eyeglass device 3 may be communicated to the viewer by means of the adjustment operation of the light amount by the left and right filters 31, 32 with the aforementioned low frequency band.

For example, the signal generator 380 and/or the detector 360 of the eyeglass device 3 may measure a period during which the synchronization signal is received. The measurement gives information about a time period (viewing time) during which the viewer views the stereoscopic video. If the viewer views the stereoscopic video beyond the threshold (viewing time threshold) (for example, 2 hours or 3 hours), which is defined for the viewing time period, the voltage detector 361 or the reception detector 391 may output a warning signal to the controller 400. A fourth control signal for executing the light amount adjustment at an adjustment frequency of 0.5 Hz or more and 40 Hz or less may be output in response to the warning signal from the controller 400 to the driver 370. As a result of the driver 370 causing the left and right filters 31, 32 to perform the light amount adjustment at an adjustment frequency of 0.5 Hz or more and 40 Hz or less in response to the fourth control signal, the viewer is notified that the viewer has viewed the stereoscopic video for a prolonged time.

The notification may makes it likely that the viewer takes a break from viewing the stereoscopic video, so that it becomes less likely that the viewer suffers excessive eye fatigue.

(Intermittent Second Control Mode)

Figure 11:
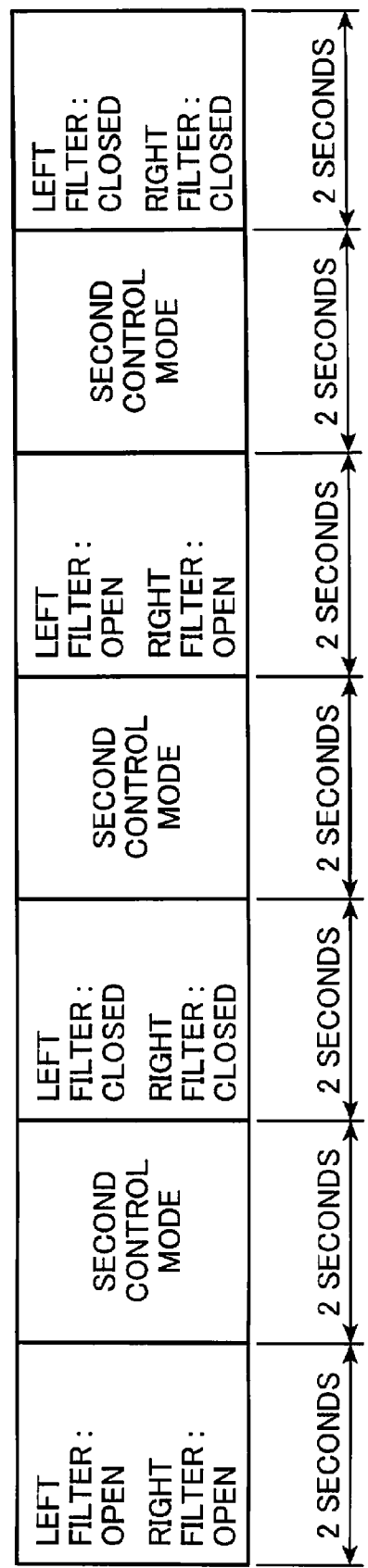
FIG. 11 is a conceptual view schematically showing an intermittent second control mode.

FIG. 11 shows the second control mode, which is intermittently executed. The second control mode intermittently executed is described with reference to FIGS. 7, 9 and 11.

As described above, the operation of the optical filter portion 33 in the second control mode causes the viewer to perceive flickering. It is likely that the viewer feels flickering uncomfortable. As shown in FIG. 11, if the second control mode is intermittently executed in a relatively short period of time (for example, 2 seconds), the discomfort of the viewer may be moderated because the viewer does not continuously perceive the flickering. Between the preceding second control mode and the subsequent second control mode, the optical filter portion 33, for example, may keep both the left and right filters 31, 32 in an open or close orientation. The interval between the second control modes may be set, for example, to 2 seconds.

If the second control mode is intermittently executed at a given cycle, the viewer may perceive the flickering which is generated and controlled by the eyeglass device 3. Accordingly, it becomes likely that the viewer recognizes that the eyeglass device 3 attempts to communicate information to the viewer and that the flickering is not a result of malfunction of the eyeglass device 3.

The aforementioned embodiment mainly comprises the following configuration.

The eyeglass device for assisting in viewing a video to be stereoscopically perceived comprises an optical filter portion including a left filter configured to adjust a light amount which is transmitted to a left eye and a right filter configured to adjust a light amount which is transmitted to a right eye; and a controller configured to control adjustment operation of the light amount by the optical filter portion, wherein the controller switches a control mode of the optical filter portion between a first control mode of controlling the optical filter portion so that the adjustment operation becomes synchronized with display of a frame image of the video and a second control mode of controlling the optical filter portion so that the adjustment operation becomes slower than a frame rate of the video to make a viewer perceive the adjustment operation which is asynchronous with the display of the frame image.

According to the aforementioned configuration, the viewer uses the eyeglass device to stereoscopically perceive the video. The optical filter of the eyeglass device includes the left filter configured to adjust the light amount to be transmitted to the left eye and the right filter configured to adjust the light amount to be transmitted to the right eye. The controller controls the adjustment operation of the light amount by the optical filter portion. The controller switches the control mode of the optical filter portion between the first and second control modes. Under the first control mode, the adjustment operation of the optical filter portion synchronizes with the display of the frame image of the video. Under the second control mode, the adjustment operation of the optical filter portion is slower than the frame rate of the video and asynchronous with the display of the frame image. Thus, the viewer may perceive the operation of the eyeglass device under the second control mode. The viewer may thereby receive information from the eyeglass device.

In the aforementioned configuration, preferably, the eyeglass device further comprises a receiver configured to receive a synchronization signal which is in synchronism with the display of the frame image, wherein the controller controlling the optical filter portion under the first control mode causes the optical filter portion to execute the adjustment operation in response to the synchronization signal, and the controller controlling the optical filter portion under the second control mode causes the optical filter portion to execute the adjustment operation independently of the synchronization signal.

According to the aforementioned configuration, the eyeglass device further comprises the receiver configured to receive a synchronization signal which is in synchronism with the display of the frame image. The controller controlling the optical filter portion in the first control mode causes the optical filter portion to execute the adjustment operation in response to the synchronization signal. The controller controlling the optical filter portion in the second control mode causes the optical filter portion to execute the adjustment operation independently of the synchronization signal. Since the viewer may perceive the operation of the eyeglass device under the second control mode, the viewer may receive information from the eyeglass device.

In the aforementioned configuration, preferably, the controller controlling the optical filter portion under the second control mode controls the optical filter portion so that the left and right filters execute the adjustment operation at a predetermined adjustment frequency which is no more than half the frame rate of the video.

According to the aforementioned configuration, since the optical filter portion is controlled so that the left and right filters execute the adjustment operation with a predetermined adjustment frequency which is less than half the frame rate of the video, the viewer may receive information from the eyeglass device.

In the aforementioned configuration, preferably, the eyeglass device further comprises a detector which detects a failure factor that inhibits synchronization between the adjustment operation of the light amount by the optical filter portion operated under the first control mode and the display of the frame image, and outputs failure information about the detected failure factor, wherein if the detector outputs the failure information, the controller switches the control mode from the first control mode to the second control mode.

According to the aforementioned configuration, the detector of the eyeglass device detects a failure factor which inhibits the synchronization between the adjustment operation of the light amount by the optical filter portion operated under the first control mode and the display of the frame image. The detector then outputs failure information about the detected failure factor. Since the controller switches the control mode from the first control mode to the second control mode if the detector outputs the failure information, the viewer may receive information from the eyeglass device.

In the aforementioned configuration, preferably, the eyeglass device further comprises a battery which is used as a power source of the eyeglass device, wherein the detector outputs the failure information if a voltage of the battery is lower than a voltage threshold defined for the voltage of the battery.

According to the aforementioned configuration, if the battery voltage falls below the voltage threshold, the detector outputs the failure information. The controller controls the optical filter portion so that the left and right filters execute the adjustment operation on the basis of the failure information at an adjustment frequency, which is slower than the display frequency of the frame image. Accordingly, the viewer wearing the eyeglass device may visually identify that the battery voltage of the eyeglass device is low on the basis of the adjustment operation of the left and right filters at the adjustment frequency, which is less than half the frame rate of the video.

In the aforementioned configuration, preferably, the detector outputs the failure information unless the receiver receives the synchronization signal for a period longer than a non-reception threshold defined for a non-reception period, during which the synchronization signal is not received.

According to the aforementioned configuration, the failure information is output unless the eyeglass device receives the synchronization signal for a period that is longer than the non-reception threshold. The controller controls the optical filter portion so that the left and right filters execute the adjustment operation on the basis of the failure information at the adjustment frequency, which is slower than the display frequency of the frame image. Accordingly, the viewer wearing the eyeglass device may visually identify that there is no reception of the synchronization signal by the eyeglass device, on the basis of the adjustment operation of the left and right filters at the adjustment frequency, which is less than half the frame rate of the video.

In the aforementioned configuration, preferably, the failure information includes first failure information representing that a voltage of a battery used as a power source of the eyeglass device is lower than a voltage threshold defined for the voltage of the battery and second failure information representing that the synchronization signal has not been received for the period longer than the non-reception threshold defined for the non-reception period, and the controller controls the optical filter portion so that the adjustment operation of the left and right filters based on the first failure information differs from the adjustment operation of the left and right filters based on the second failure information.

According to the aforementioned configuration, since the adjustment operation of the left and right filters on the basis of the first failure information representing that the battery voltage is lower than the voltage threshold is different from the adjustment operation of the left and right filters on the basis of the second failure information representing that the non-reception period, during which the synchronization signal has not been received, is longer than the non-reception threshold, the viewer may determine whether the low battery voltage or the non-reception of the synchronization signal causes the failure factor.

In the aforementioned configuration, preferably, the adjustment frequency is 0.5 Hz or more and 40 Hz or less.

According to the aforementioned configuration, since the adjustment operation of the left and right filters is executed at a frequency band of 0.5 Hz or more and 40 Hz or less, the viewer may visually capture the motion of the left and right filters, so that a failure of the eyeglass device may be appropriately notified.

In the aforementioned configuration, preferably, the adjustment frequency is 5 Hz or more and 20 Hz or less.

According to the aforementioned configuration, since the adjustment operation is executed within the range of 5 Hz or more and 20 Hz or less where it is most likely that the viewer may perceive flickering, the viewer may visually capture the motion of the left and right filters. Consequently, a failure of the eyeglass device may be appropriately notified.

In the aforementioned configuration, preferably, the adjustment frequency is 0.5 Hz or more and 5 Hz or less.

According to the aforementioned configuration, since the adjustment operation of the left and right filters is executed at a frequency band of 0.5 Hz or more and 5 Hz or less, the left and right filters may perform the adjustment operation at a frequency band which sufficiently reduces a risk of an optically-stimulated epileptic seizure.

In the aforementioned configuration, preferably, the second control mode is intermittently executed.

According to the aforementioned configuration, since the second control mode is intermittently executed, it becomes less likely that the viewer becomes unpleasant than continuous operation of the optical filter under the second control mode. Since the optical filter portion intermittently performs the asynchronous operation, the viewer may be facilitated to perceive the asynchronous operation of the eyeglass device. The viewer may thereby receive information from the eyeglass device.

The video system according to the aforementioned embodiments comprises a display device for displaying a video to be stereoscopically perceived, and an eyeglass device for assisting in viewing the video, wherein the display device includes a transmitter configured to transmit a synchronization signal which synchronizes with display of a frame image of the video, the eyeglass device includes an optical filter portion which has a left filter configured to adjust a light amount to be transmitted to a left eye and a right filter configured to adjust a light amount to be transmitted to a right eye; and a controller configured to control adjustment operation of the light amount by the optical filter portion, and the controller switches a control mode of the optical filter portion between a first control mode of controlling the optical filter portion so that the adjustment operation becomes synchronized with the display of the frame image of the video, and a second control mode of controlling the optical filter portion so that the adjustment operation becomes slower than a frame rate of the video to make a viewer perceive the adjustment operation which is asynchronous with the display of the frame image.

According to the aforementioned configuration, the viewer uses the eyeglass device to stereoscopically perceive the video. The optical filter of the eyeglass device includes the left filter configured to adjust the light amount to be transmitted to the left eye and the right filter configured to adjust the light amount to be transmitted to the right eye. The controller controls the adjustment operation of the light amount by the optical filter portion. The controller switches the control mode of the optical filter portion between the first and second control modes. Under the first control mode, the adjustment operation of the optical filter portion synchronizes with the display of the frame image of the video. Under the second control mode, the adjustment operation of the optical filter portion is slower than the frame rate of the video and asynchronous with the display of the frame image. Thus, the viewer may perceive the eyeglass device operated under the second control mode. The viewer may thereby receive information from the eyeglass device.

The principles of the aforementioned embodiment may be suitably applied to technologies for viewing stereoscopic videos.

The invention claimed is:

1. An eyeglass device for assisting in viewing a video to be stereoscopically perceived comprising:
   an optical filter portion including a left filter configured to adjust a light amount which is transmitted to a left eye and a right filter configured to adjust a light amount which is transmitted to a right eye; and
   a controller configured to control adjustment operation of the light amount by the optical filter portion,
   wherein the controller switches a control mode of the optical filter portion between a first control mode of controlling the optical filter portion so that the adjustment operation becomes synchronized with display of a frame image of the video and a second control mode of controlling the optical filter portion so that a viewer perceives the adjustment operation asynchronous with the display of the frame image, and
   wherein the controller controlling the adjustment operation under the second control mode sets and repeats an adjustment period which is longer than a display period of the frame image and evenly divided into a first period for maximizing a light amount transmitted to one of the left and right eyes and a second period for minimizing a light amount transmitted to the one of the left and right eyes.

2. The eyeglass device according to claim 1 further comprising a receiver configured to receive a synchronization signal which is in synchronism with the display of the frame image, wherein
the controller controlling the optical filter portion under the first control mode causes the optical filter portion to execute the adjustment operation in response to the synchronization signal, and
the controller controlling the optical filter portion under the second control mode causes the optical filter portion to execute the adjustment operation independently of the synchronization signal.

3. The eyeglass device according to claim 2, wherein
the controller controlling the optical filter portion under the second control mode controls the optical filter portion so that the left and right filters execute the adjustment operation at a predetermined adjustment frequency which is no more than half a frame rate of the video.

4. The eyeglass device according to claim 2 further comprising a detector which detects a failure factor that inhibits synchronization between the adjustment operation of the light amount by the optical filter portion operated under the first control mode and the display of the frame image, and outputs failure information about the detected failure factor, wherein
if the detector outputs the failure information, the controller switches the control mode from the first control mode to the second control mode.

5. The eyeglass device according to claim 4 further comprising a battery which is used as a power source of the eyeglass device, wherein
the detector outputs the failure information if a voltage of the battery is lower than a voltage threshold defined for the voltage of the battery.

6. The eyeglass device according to claim 4, wherein
the detector outputs the failure information unless the receiver receives the synchronization signal for a period longer than a non-reception threshold defined for a non-reception period, during which the synchronization signal is not received.

7. The eyeglass device according to claim 6, wherein
the failure information includes:
first failure information representing that a voltage of a battery used as a power source of the eyeglass device is lower than a voltage threshold defined for the voltage of the battery; and
second failure information representing that the synchronization signal has not been received for the period longer than the non-reception threshold defined for the non-reception period, and
the controller controls the optical filter portion so that the adjustment operation of the left and right filters based on the first failure information differs from the adjustment operation of the left and right filters based on the second failure information.

8. The eyeglass device according to claim 3, wherein the adjustment frequency is 0.5 Hz or more and 40 Hz or less.

9. The eyeglass device according to claim 3, wherein the adjustment frequency is 5 Hz or more and 20 Hz or less.

10. The eyeglass device according to claim 3, wherein the adjustment frequency is 0.5 Hz or more and 5 Hz or less.

11. The eyeglass device according to claim 1, wherein the second control mode is intermittently executed.

12. A video system comprising a display device for displaying a video to be stereoscopically perceived, and an eyeglass device for assisting in viewing the video,
wherein the display device includes a transmitter configured to transmit a synchronization signal which synchronizes with display of a frame image of the video,
wherein the eyeglass device includes:
(i) an optical filter portion which has a left filter configured to adjust a light amount to be transmitted to a left eye and a right filter configured to adjust a light amount to be transmitted to a right eye; and
(ii) a controller configured to control adjustment operation of the light amount by the optical filter portion, the controller switching a control mode of the optical filter portion between a first control mode of controlling the optical filter portion so that the adjustment operation becomes synchronized with the display of the frame image of the video, and a second control mode of controlling the optical filter portion so that a viewer perceives the adjustment operation asynchronous with the display of the frame image,
wherein the controller controlling the adjustment operation under the second control mode sets and repeats an adjustment period which is longer than a display period of the frame image and evenly divided into a first period for maximizing a light amount transmitted to the one of the left and right eyes and a second period for minimizing a light amount transmitted to the one of the left and right eyes.

13. The eyeglass device according to claim 7,
wherein the controller minimizes a light amount transmitted to another of the left and right eyes in the first period and maximizes a light amount transmitted to the other of the left and right eyes in the second period when the detector outputs one of the first failure information and the second failure information, and
wherein the controller maximizes a light amount transmitted to the other of the left and right eyes in the first period and minimizes a light amount transmitted to another of the left and right eyes in the second period when the detector outputs another of the first failure information and the second failure information.

* * * * *